(12) United States Patent
Butz et al.

(10) Patent No.: US 6,398,284 B1
(45) Date of Patent: Jun. 4, 2002

(54) THROUGH-SEAT FREIGHT HOLDER FOR MOTOR VEHICLE

(75) Inventors: Peter Butz, Hamburg; Wolfgang Sitzler, Wuppertal, both of (DE)

(73) Assignee: Peter Butz GmbH & Co., Verwal/tungs-KG, Langenfeld (DE)

(*) Notice: Subject to any disclaimer, the term of this patent is extended or adjusted under 35 U.S.C. 154(b) by 0 days.

(21) Appl. No.: 09/943,371

(22) Filed: Aug. 30, 2001

(30) Foreign Application Priority Data

Aug. 30, 2000 (DE) .......................................... 100 42 812
Jul. 5, 2001 (DE) .......................................... 101 32 081

(51) Int. Cl.[7] ................................................ B60R 7/06
(52) U.S. Cl. .............................. 296/37.15; 296/37.16; 296/63
(58) Field of Search ............................. 296/37.16, 37.5, 296/37.8, 37.15, 37.14, 24.1, 63; 297/188.04, 188.06, 188.07

(56) References Cited

U.S. PATENT DOCUMENTS

| | | | | |
|---|---|---|---|---|
| 5,599,054 A | * | 2/1997 | Butz et al. ................. | 296/37.8 |
| 5,632,520 A | * | 5/1997 | Butz ......................... | 296/24.1 |
| 5,816,640 A | * | 10/1998 | Nishinura .................. | 296/37.8 |
| 6,076,880 A | * | 6/2000 | Coffer et al. ............. | 296/65.09 |

FOREIGN PATENT DOCUMENTS

| | | |
|---|---|---|
| DE | 37 38 931 | 6/1989 |
| DE | 297 11 197 | 10/1998 |
| JP | 61-193949 | * 8/1986 |

* cited by examiner

Primary Examiner—Joseph D. Pape
(74) Attorney, Agent, or Firm—Herbert Dubno; Andrew Wilford

(57) ABSTRACT

A transport container for a motor vehicle having a partition between two compartments has a generally rectangular vehicle frame set in the partition and a generally rectangular device frame fittable in the opening of the vehicle frame. Respective pivot formations on the vehicle frame define a pivot axis parallel to and between vehicle-frame upper and lower members. Respective pivot formations on the device frame between and parallel to device-frame upper and lower members and fittable to the respective vehicle-frame pivot formations allow pivoting of the device frame into a mounted position set in the vehicle frame with the members of the device frame closely juxtaposed with the respective members of the vehicle frame and the frames in direct contact with each other at abutment locations offset from the axis. A latch offset from the axis releasably secures the device frame in the mounted position in the vehicle frame.

20 Claims, 9 Drawing Sheets

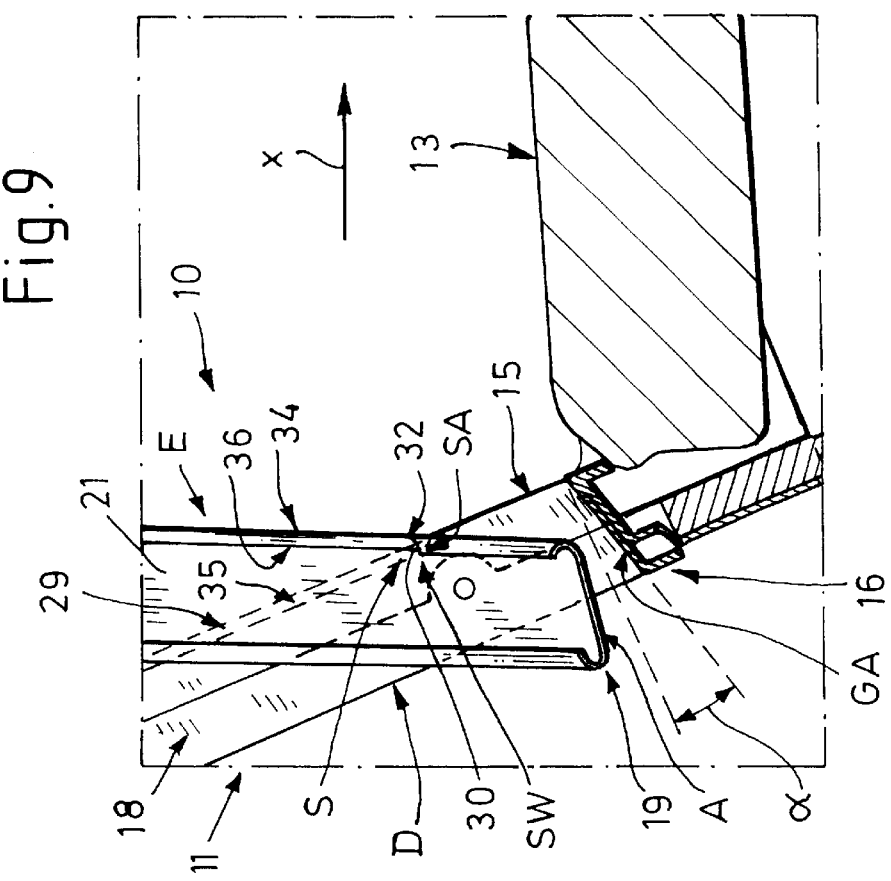
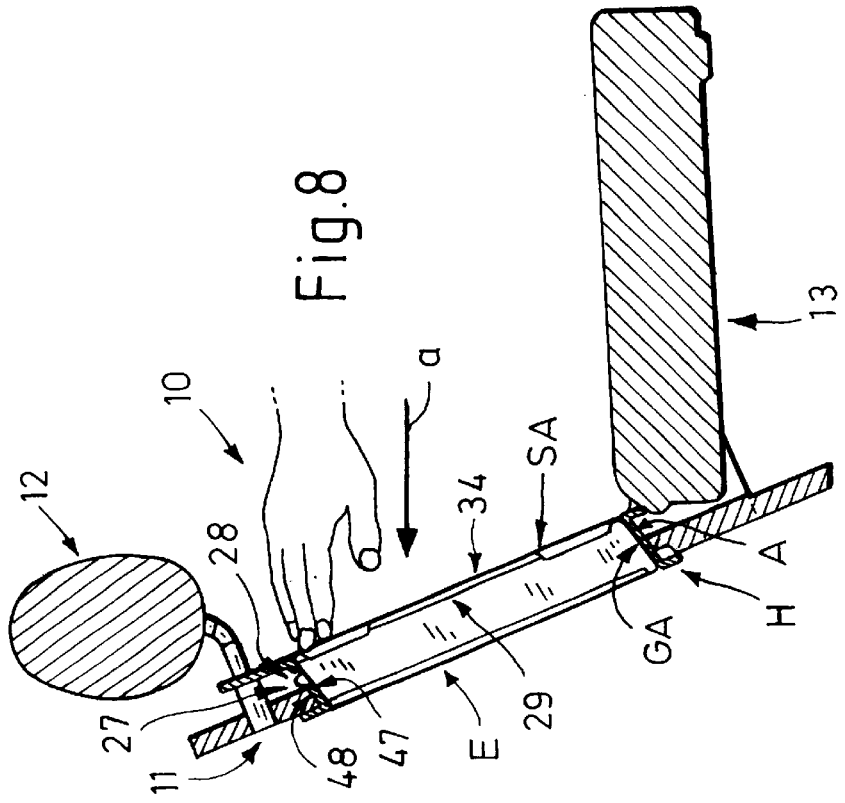

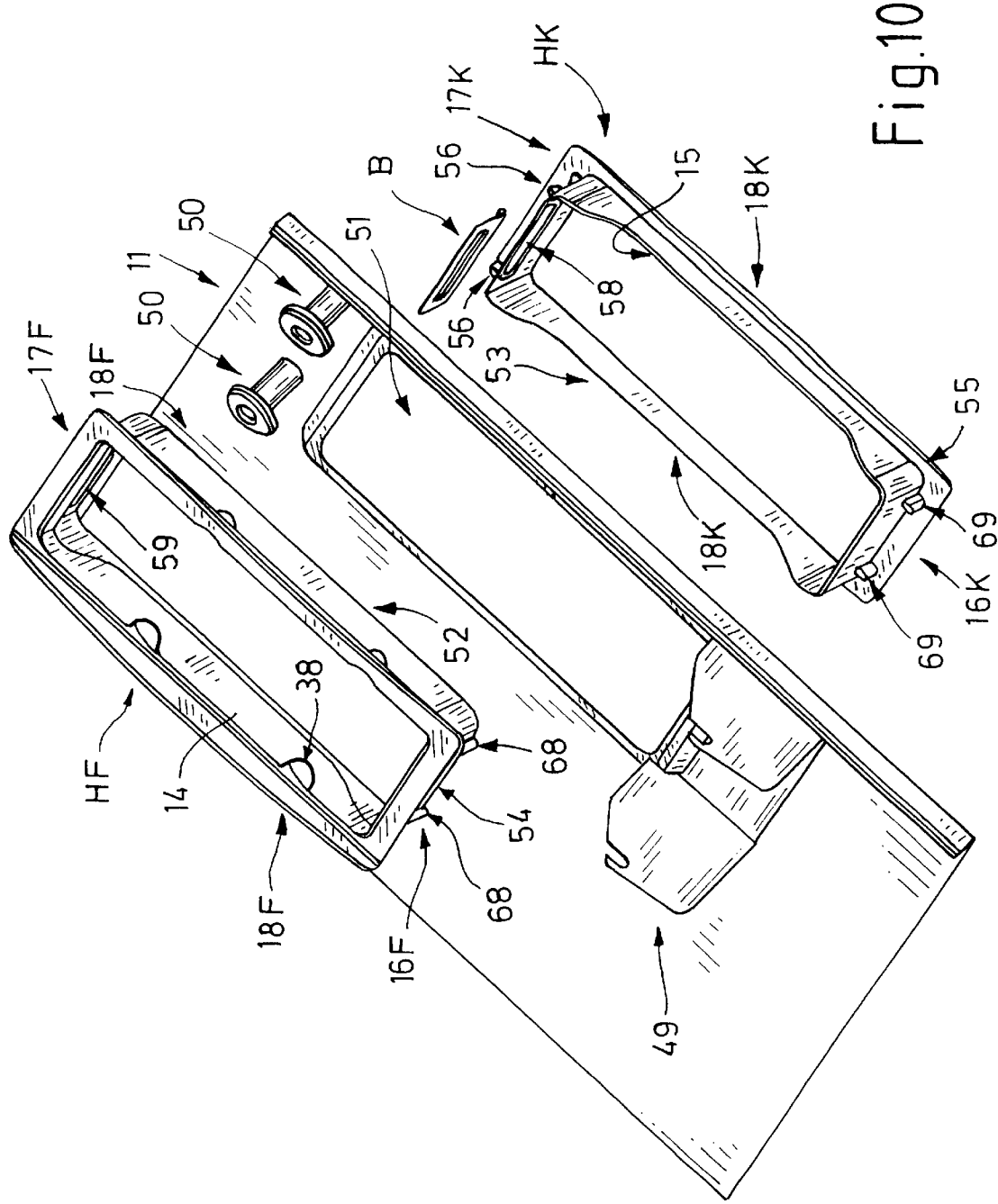

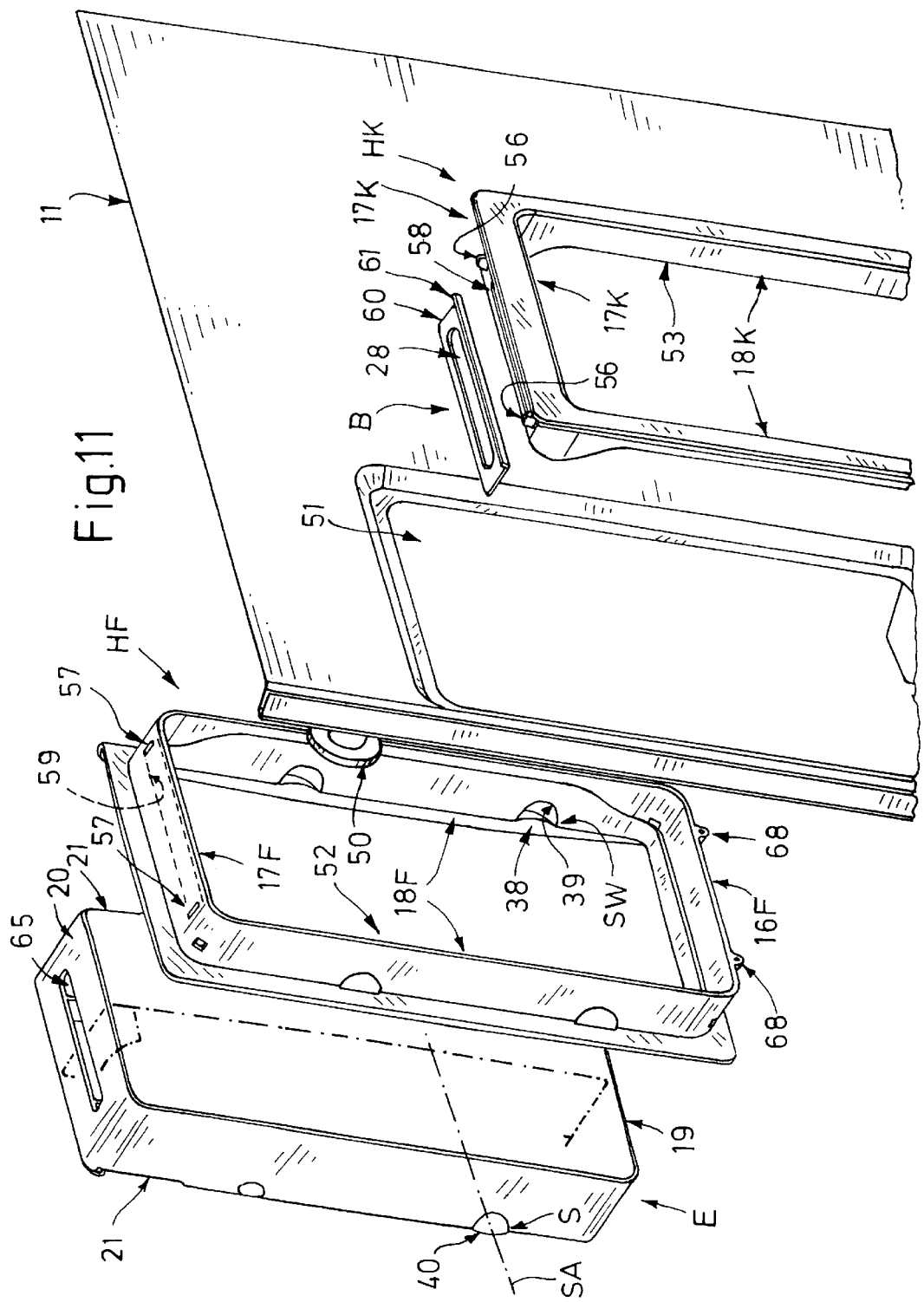

THROUGH-SEAT FREIGHT HOLDER FOR MOTOR VEHICLE

FIELD OF THE INVENTION

The present invention relates to a freight holder for a motor vehicle. More particularly this invention concerns a removable device that allows long freight to extend through a partition—motor-vehicle seat back or the like—between two compartments in a motor vehicle.

BACKGROUND OF THE INVENTION

In order to accommodate long freight in a motor vehicle, it is known to provide systems that allow the freight to pass through the seat back and/or the wall of the rear freight compartment. Thus the freight can extend from the wayback in a van or station wagon or the trunk in a car right through a rear seat back or even the back of the passenger front seat so that, for example, skis can be transported even inside a short vehicle.

German patent 3,738,931 of W. Trutter describes such a system. The seat back or wall is formed with a throughgoing normally rectangular hole that has a frame with upper, lower, and side members. The lower frame member is of upwardly tapering trapezoidal section. A freight-holding device has a frame adapted to sit within this frame and that has a lower saddle-shaped or downwardly U-shaped rail that fits over the bottom member of the frame, and a peripheral flange projecting on a front face past the device frame. Thus this device can be fitted to the seat back by setting the bottom rail of the removable part over the bottom member of the stationary frame and then pivoting it back until the laterally projecting flange comes to rest on the front of the seat back. A latch secures this device in place.

The device is typically annular and holds a bag that can extend forward. Thus skis, fishing poles, or the like inserted from the rear through the bag project forward into the passenger compartment, but are enclosed so that the occupants of the passenger compartment do not come into direct contact with the freight. Wet skis, for example, do not make a mess in the passenger compartment.

In German utility model 297 11 197 published Jan. 1, 1998, another similar system is shown which carries on its front face a cushion that normally forms part of the seat back. The frame of this device is of fairly complex construction, as is the latch that holds it in place. In this system the intent is merely to provide a hole through the seat that can be used without any other device for accommodating long freight.

OBJECTS OF THE INVENTION

It is therefore an object of the present invention to provide an improved through-seat freight holder for a motor vehicle.

Another object is the provision of such an improved through-seat freight holder for a motor vehicle which overcomes the above-given disadvantages, that is which is substantially simpler to manufacture and use than the prior-art systems.

SUMMARY OF THE INVENTION

A transport container for a motor vehicle having a partition between two compartments has according to the invention a generally rectangular vehicle frame set in the partition and having generally parallel longitudinal members and generally parallel transverse members interconnecting ends of the longitudinal members and defining therewith an opening. A generally rectangular device frame fittable in the opening of the vehicle frame has generally parallel longitudinal members and generally parallel transverse members interconnecting ends of the respective longitudinal members. Respective pivot formations on the vehicle frame between the vehicle-frame longitudinal members define a pivot axis parallel to and between the vehicle-frame longitudinal members. Respective pivot formations on the device frame between and parallel to the device-frame longitudinal members and fittable to the respective vehicle-frame pivot formations allow pivoting of the device frame into a mounted position set in the vehicle frame with the members of the device frame closely juxtaposed with the respective members of the vehicle frame and the frames in direct contact with each other at abutment locations offset from the axis. A latch offset from the axis releasably secures the device frame in the mounted position in the vehicle frame.

This construction is fairly simple and allows the device frame to be fitted to the vehicle frame by a simple central pivoting movement. At the end of the pivoting movement the upper and lower longitudinal members engage each other to block further movement of the device frame, then the latch holds the frames in this position. Use of the device is extremely easy, it is very solidly held and mounted when in place, and it is inexpensive to manufacture.

The locations according to the invention are faces of the lower horizontal members that extend in planes forming an acute angle to planes of the frames. Furthermore the latch is provided on the upper horizontal members. The lower horizontal members have planar surfaces forming the locations. In addition the upper horizontal members have planar surfaces parallel to the surfaces of the lower horizontal members. In this manner, once set in place, the device frame is held very solidly.

The vehicle-frame pivot formations in accordance with the invention are seats formed in the vehicle-frame side or transverse members. The seats are of semicircular shape and the side members can each be formed with an L-shaped slot having an outer end open outwardly and an inner end forming the respective seat. The device-frame pivot formations project outward from the device-frame side members. Alternately the seats are elongated parallel to the respective vehicle-frame side members and the device-frame pivot formations are flat tabs complementary to the seats and projecting outward from the device-frame side members.

The latch according to the invention includes a movable bolt carried on one of the upper horizontal members and a keeper recess on the other of the upper horizontal members and in which the bolt is receivable. Normally the one upper horizontal member is the device-frame upper horizontal member.

The vehicle frame according to the invention is unitarily formed of plastic. In addition a metal plate is fixed to the one upper horizontal member and forming the keeper recess to reinforce it at the latch. More particularly the vehicle frame is formed of a pair of frame halves having telescopingly interengageable sleeves and the plate is provided between the sleeves. The plate is of L-section and has a tab extending parallel to a plane of the vehicle frame and engaged behind a portion of the vehicle frame. Furthermore the tab engages to a storage-compartment side behind the partition.

An annular seal is set according to the invention in one of the frames and peripherally engages the other of the frames in the mounted position. Furthermore openable covers are provided on the device frame so that a ski sack or the like can be held inside the device frame. Each of the frames is unitarily formed of plastic and the partition is a seat back.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIGS. 4 through 8 are sectional side views showing the use of yet another system according to the invention;

FIG. 9 is a large-scale view of a detail of FIG. 6;

FIG. 10 is an exploded perspective view of a further freight holder in accordance with the invention, seen from the front;

FIG. 11 is the system of FIG. 11, seen from the back;

SPECIFIC DESCRIPTION

Figure 1:
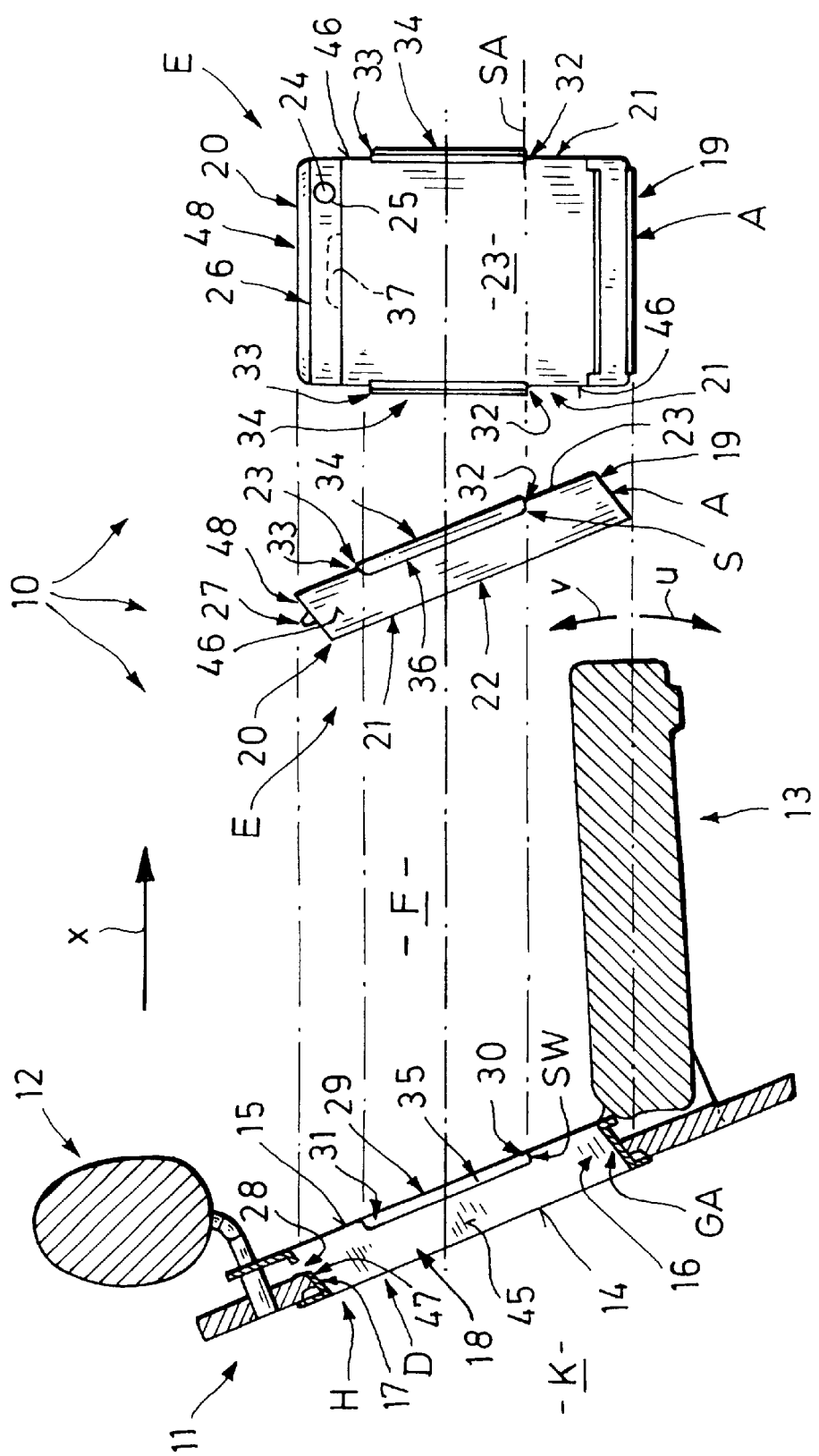
FIG. 1 is an exploded and partly sectional and rotated front view of the parts of the freight-holding system according to the invention.

As seen in FIG. 1 a freight storage device 10 is used in a generally vertical motor-vehicle seat back 11 that can be swung forward (arrow v) and backward (arrow u), that has a head rest 12 and an arm rest 13, and that lies between a rear freight compartment K and a front passenger compartment F. A frame H set into the seat is basically rectangular, defines a horizontally throughgoing passage D extending between the compartments F and K, and has a back side 14 and a front side 15. The frame H is formed by a horizontal or longitudinal lower member 16, a horizontal or longitudinal upper member 17, and a pair of generally vertical side or transverse members 18 fixed to ends of the upper and lower members 16 and 17.

A removable device frame E fittable with the generally stationary vehicle frame H has a horizontal or longitudinal lower member 19, a horizontal or longitudinal upper member 20 above it, and a pair of normally generally vertical or transverse side members 21 fixed to ends of the upper and lower members 19 and 20. The frame E has a rear cover 22 and front cover 23 (see FIG. 2) hinged at the lower member 19 and openable to expose a ski bag extensible forward in direction x into the compartment F. A latch button 24 is actuated to release the covers 22 and 23 from the closed position shown in FIG. 1. This button 24 engages through a hole 25 and is normally protected by a flap 26 which can be raised to gain access to it. The flap 26 also operates a bolt 27 that engages in a hole 28 of the upper member 20 to lock the frame E in the frame H as described more fully below. Of course the terms "horizontal," "vertical," "upper," and "lower" are used here for convenience, it being obvious that the system would work equally well if inverted, on its side, or even on the diagonal.

The frame E is fitted to the frame H by a pair of pivot recesses 29 cut in side faces 46 of the members 18 and each having a lower end 30 and an upper end 31, the former defining a pivot axis SW. The side members 21 of the frame E are in turn provided with tabs 34 complementary to the recesses 29, projecting outward from side faces 46 of the member 18, and having lower and upper ends 32 and 33 that fit in the ends 30 and 31 in the assembled condition, the lower ends defining a pivot axis S. The recesses 29 have floors 35 recessed sufficiently to fully receive the tabs 34 and engage back faces 36 of the tabs 34.

To install the frame E, the lower edges of the tabs 34 are fitted to the lower ends 30 of the recesses 34 so that the axes S and SW are coaxial at SA. Then the entire frame E is pivoted back in the direction V until the bolt 27 fits in the hole 28 and locks it in place. This action pivots a lower face A of the frame E into flat contact with an upper face GA of the lower member 16 and an upper face 48 of the frame E into contact with a lower face 47 of the upper member 17. The frame E is removed by grasping it at a hand hole 37 through which the bolt 27 can be withdrawn.

Figure 2:
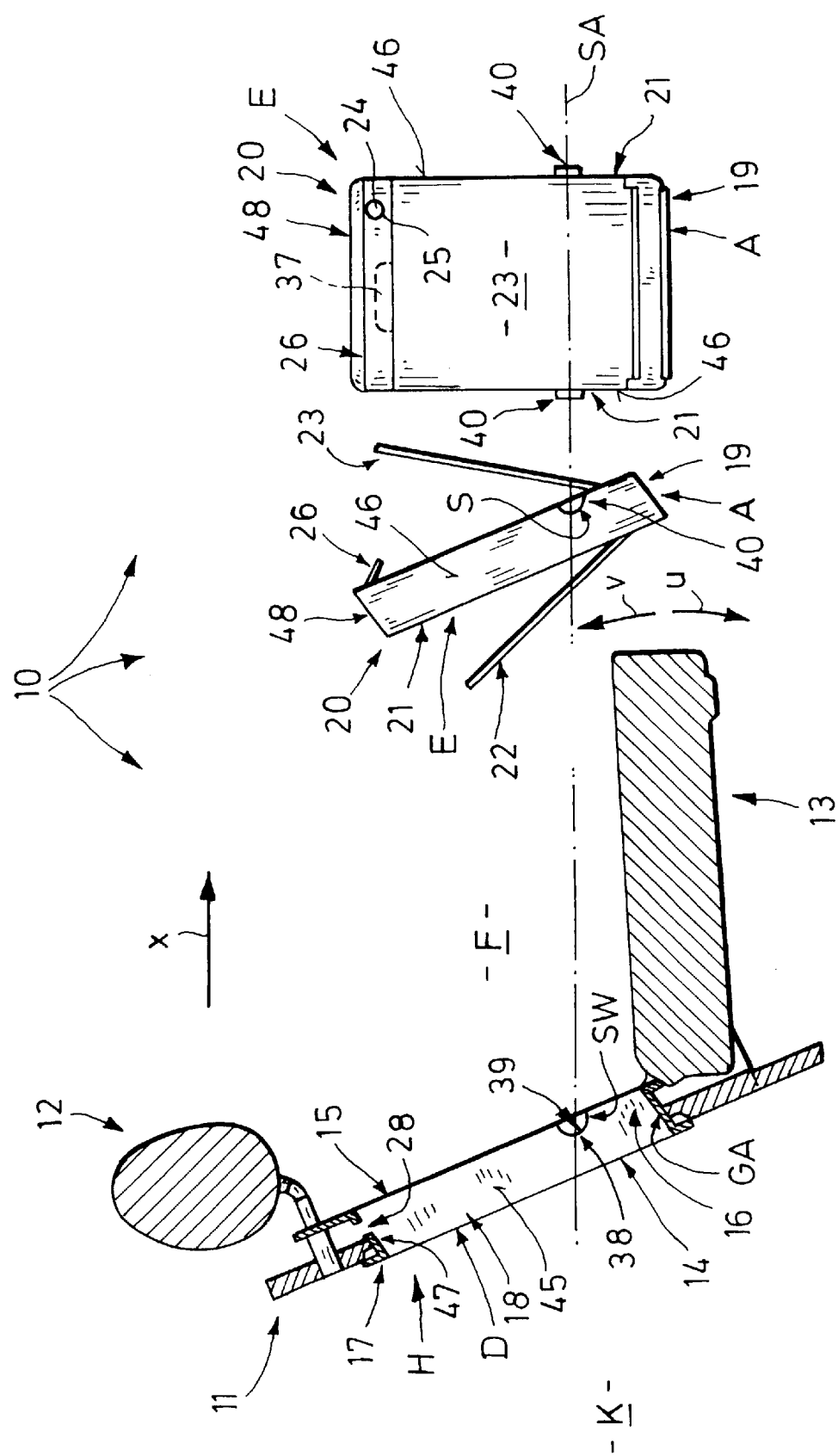
FIGS. 2 and 3 are views like FIG. 1 of further systems in accordance with the invention.

FIG. 2 shows an arrangement where the side members 18 are formed at inner faces 45 offset from the bottom member 16 with forwardly open semicircular recesses 38 defining pockets 39 adapted to receive semicircular pivot pins 40 projecting from the side faces 46. This system functions identically to that of FIG. 1.

Figure 3:
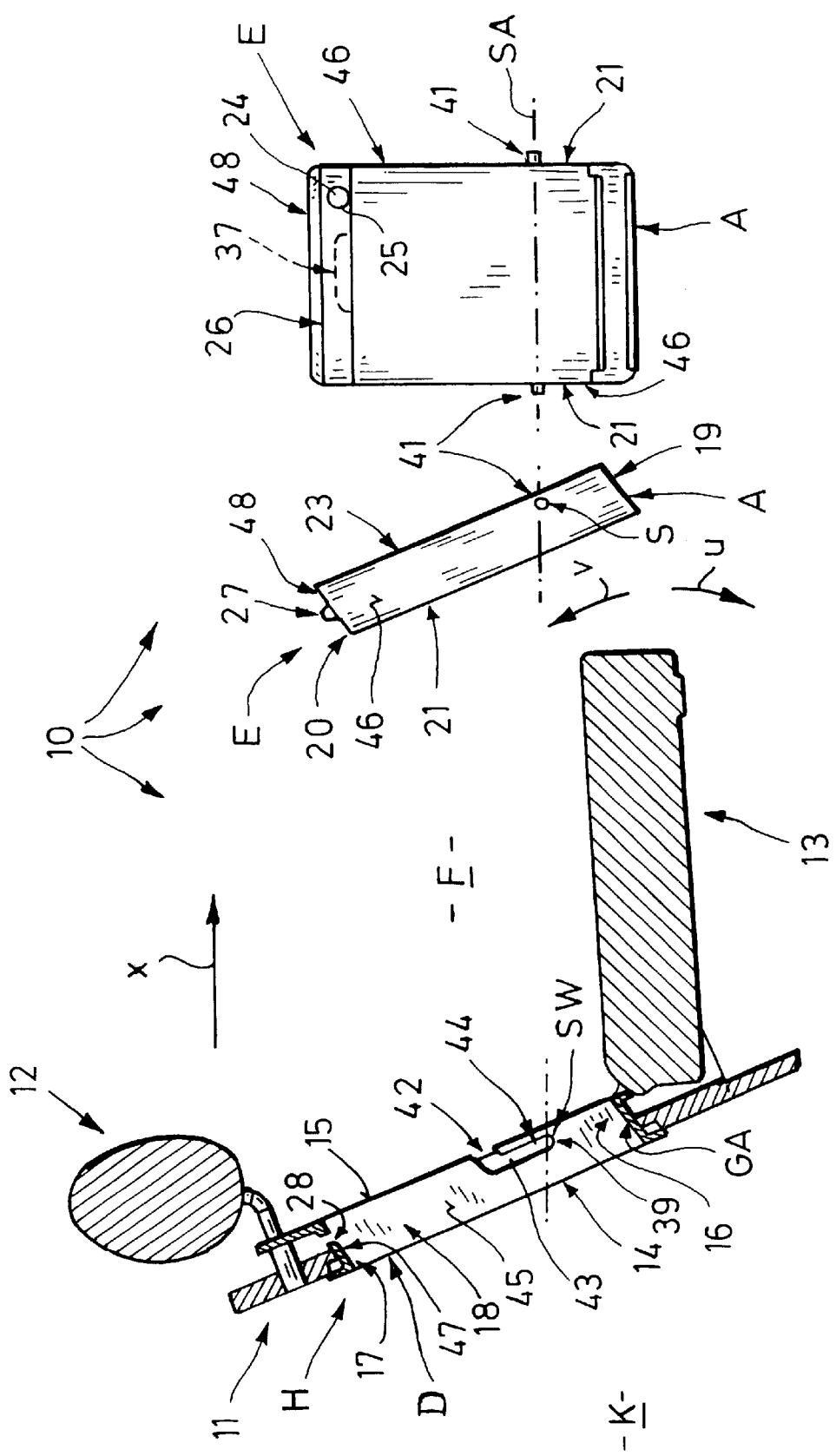

In FIG. 3 the two side members 18 are formed with L-shaped slots 44 having long legs 43 extending parallel to the members 18 and short forwardly open legs 42. The side members 21 of the frame E are provided with small cylindrical pivot pins 41. This system is used by slipping the pins 41 down in the slots 44 and until they seat at the axis SW at the pockets 39 at the bottom of the long legs 43, and then pivoting the entire frame E back into the flush position.

Figure 4:
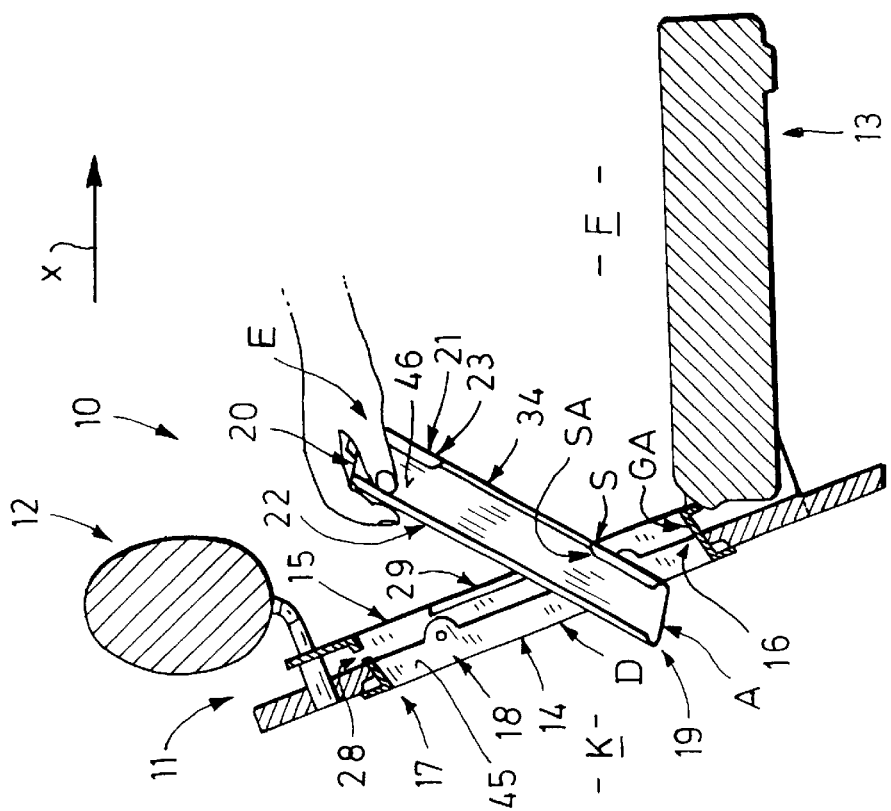
Figure 5:
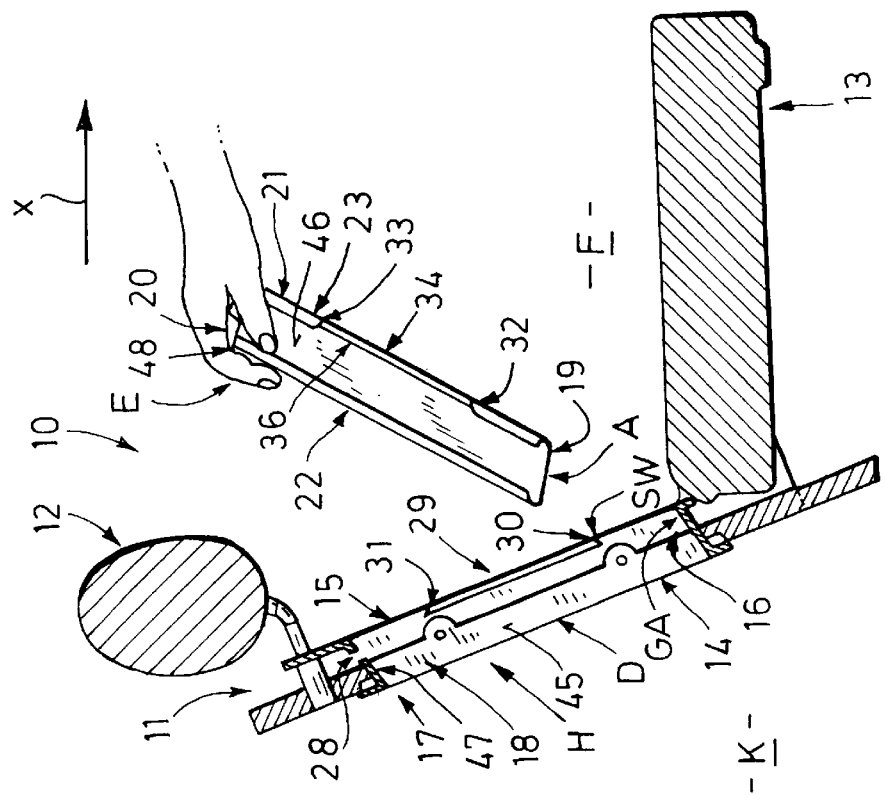
Figure 7:
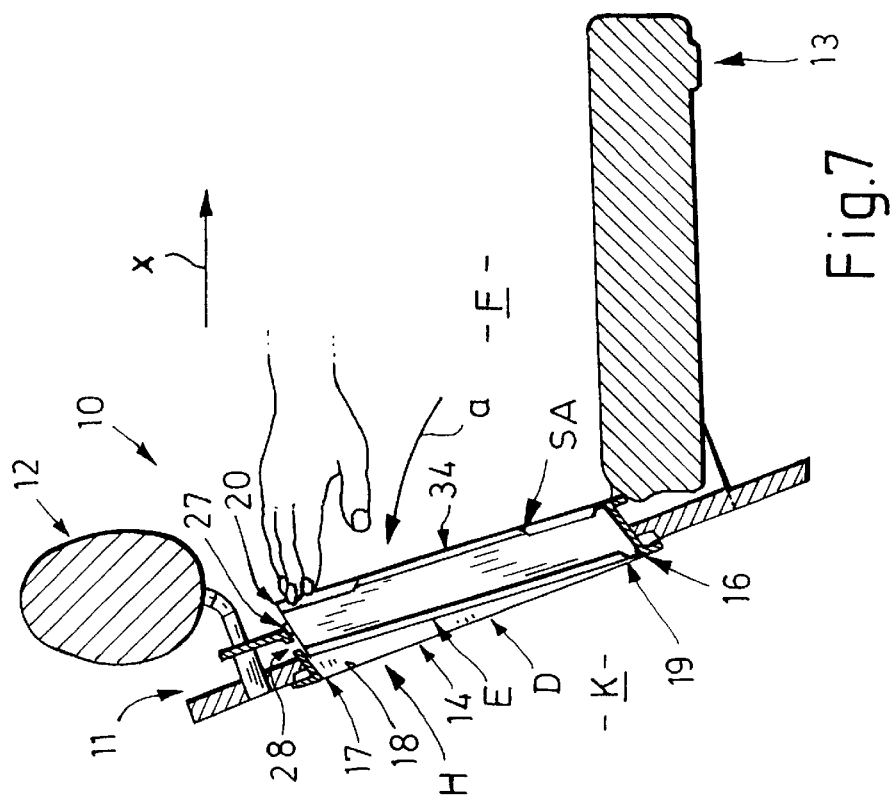
Figure 6:
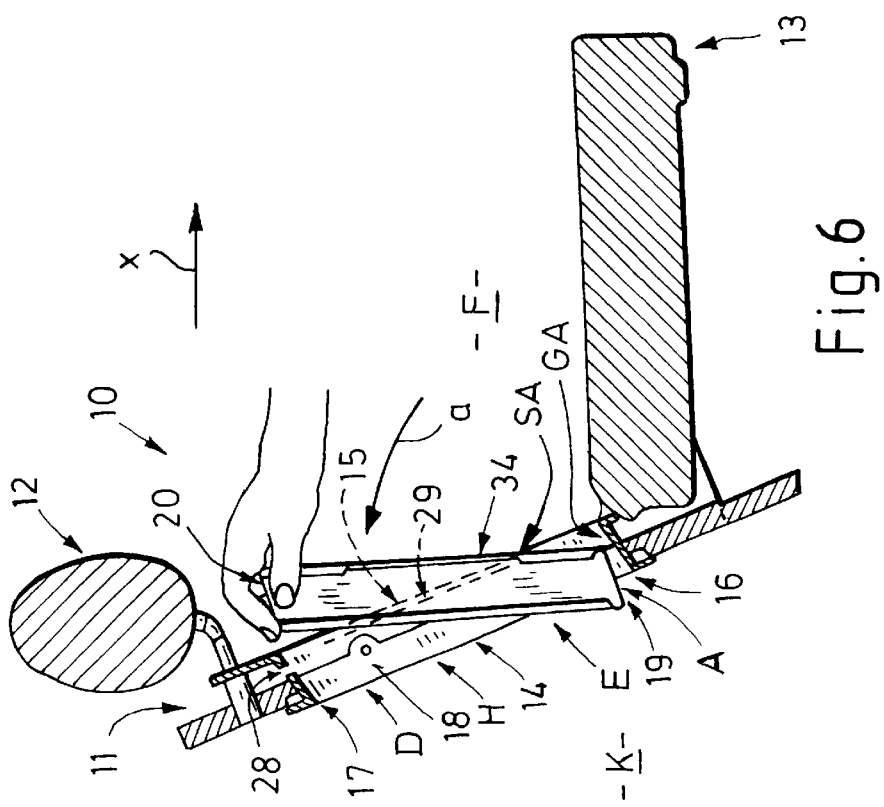
Figure 12:
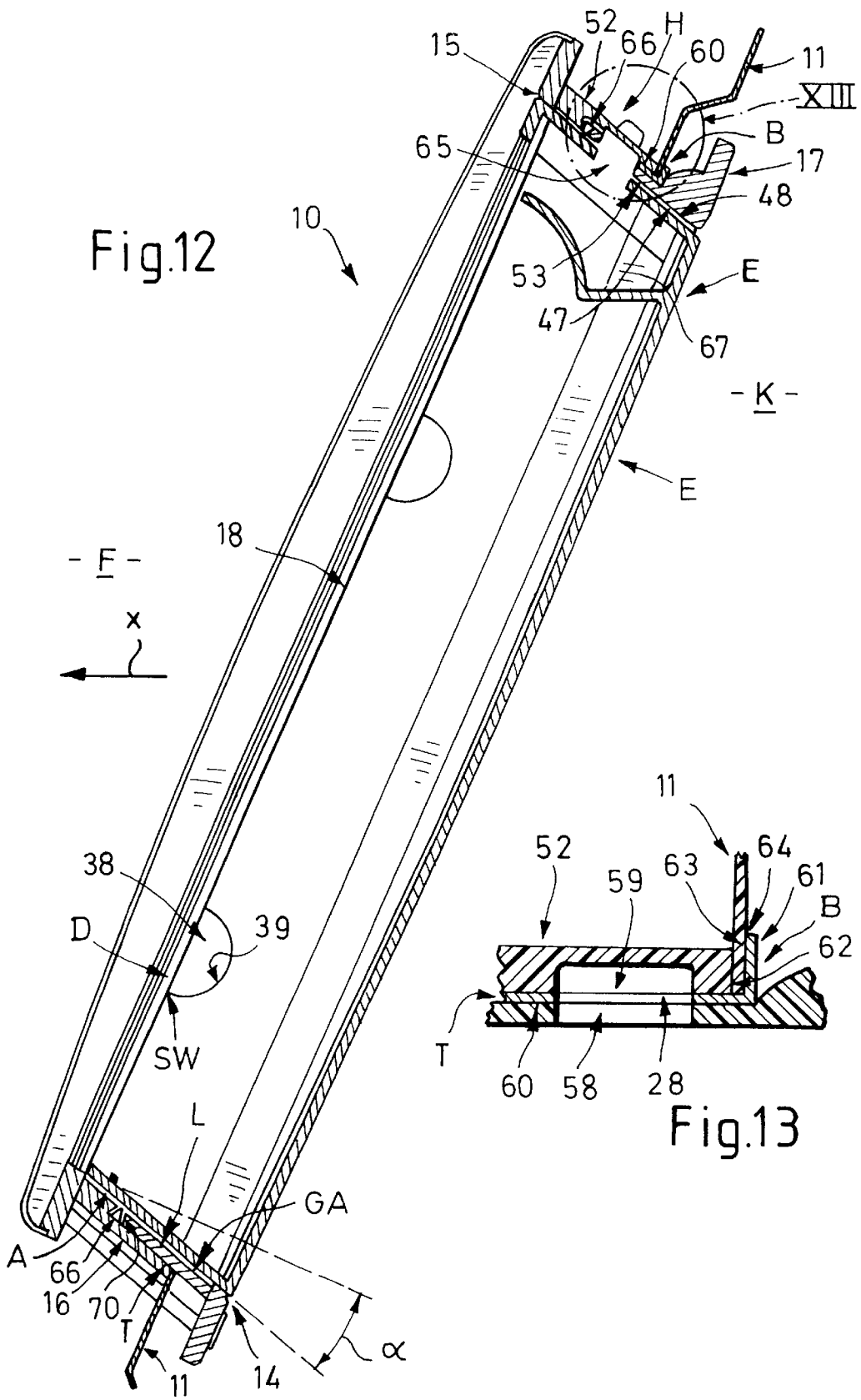
FIG. 12 is a vertical section through the system of FIG. 10.
Figure 13:
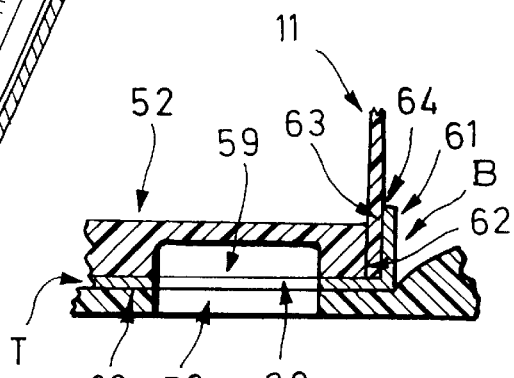
FIG. 13 is a large-sale view of the detail indicated at XIII in FIG. 12.

FIGS. 4 through 8 show a system substantially identical to that of FIG. 1. Here FIG. 4 shows how the frame E is initially inserted until as shown in FIG. 5 the edges 32 fit with the edges 30. The finger recess 37 (see FIG. 3) on the back face of the frame E makes it easy to hold. Then the frame E is tipped back in direction a as shown by FIGS. 6 and 7 until the flush position of FIG. 8 is achieved, in which position the bolt 27 snaps into the keeper hole 28.

FIG. 9 shows how the lower face GA of the opening D and the corresponding face A of the frame E extend at an acute angle a to a perpendicular to the planes of the frames H and E. The lower face 47 of the upper rail 17 is parallel to the face GA so that when the frame E comes to rest in the frame H, the fit is tight and solid.

The system of FIGS. 10 through 13 shows an arrangement where the insert frame E is formed by a front half HF at the passenger compartment F and a rear half HK at the storage compartment K, both made of molded plastic. Reference numerals from FIGS. 1 through 9 are applied for similar structure, but with an F or a K appended for the two frame halves HF and HK.

Here the seat back or partition 11 carries a mounting low bracket 49 for an unillustrated arm rest and sockets 50 for a headrest. The back 11 forms a throughgoing passage 51 in which the frame halves HF and HK are fitted. The sleeve halves HF and HK have sleeves 52 and 53, the former telescoping about the latter, and flanges 54 and 55 that are generally planar and parallel. Formations 68 and 69 on the halves HF and HK allow them to be screwed solidly together.

The sleeve 53 of the half HK is formed with an elongated hand hole 58 that aligns with and matches another such hole 59 in the half HF so that the bolt 27 (see FIGS. 1–3) can engage through them. The keeper hole 28 here is formed by an L-shaped sheet-metal part B inserted in a space T between the sleeves 52 and 53 and having a flat part 60 engaged between these sleeves 52 and 53 and a bent-up edge 61 engaged between the face flange 55 and the back of the seat back 11. Small tabs 56 on the sleeve 53 hole the part B in place. An edge 64 of the seat back 11 is engaged between an edge 62 of the sleeve 52 and a face 63 of the bent-up edge part 61 of the plate B. Thus in the event of a sudden stop or crash, the device frame E is solidly secured to the metal part B fixed in the seat back 11 and cannot pull free. The part B can have plastically deformable portions to absorb force in such an impact situation.

The frame E as shown in FIG. 11 has on its upper member 20 a slot 65 that aligns with the slot 28 in the plate B so that the unillustrated bolt 27 can pass through them both. A compartment 67 formed in the frame E accommodates the bolt structure. In addition a seal 66 is set at L in a groove 70 of the frame H to prevent the frame E from rattling and prevent any air leakage around it, something that is important when the seat back 11 is the front wall of an unheated trunk compartment.

We claim:

1. In a motor vehicle having a partition between two compartments, a transport container comprising:
   a generally rectangular vehicle frame set in the partition and having generally parallel longitudinal members and generally parallel transverse side members interconnecting ends of the longitudinal members and defining therewith an opening;
   a generally rectangular device frame fittable in the opening of the vehicle frame and having generally parallel longitudinal members and generally parallel transverse side members interconnecting ends of the respective longitudinal members;
   respective pivot formations on the vehicle frame between the vehicle-frame longitudinal members and defining a pivot axis parallel to and between the vehicle-frame longitudinal members;
   respective pivot formations on the device frame between and parallel to the device-frame longitudinal members and fittable to the respective vehicle-frame pivot formations for pivoting of the device frame into a mounted position set in the vehicle frame with the members of the device frame closely juxtaposed with the respective members of the vehicle frame and the frames in direct contact with each other at abutment locations offset from the axis; and
   latch means offset from the axis for releasably securing the device frame in the mounted position in the vehicle frame.

2. The motor-vehicle transport container defined in claim 1 wherein two of the longitudinal members form the locations and have faces that extend in planes forming an acute angle to planes of the frames.

3. The motor-vehicle transport container defined in claim 2 wherein the latch means is provided on the two longitudinal members not forming the locations.

4. The motor-vehicle transport container defined in claim 2 wherein all of the longitudinal members have planar surfaces forming abutment locations.

5. The motor-vehicle transport container defined in claim 4 wherein all of the longitudinal members have substantially parallel planar surfaces forming the locations.

6. The motor-vehicle transport container defined in claim 1 wherein the vehicle-frame pivot formations are seats formed in the vehicle-frame side members.

7. The motor-vehicle transport container defined in claim 6 wherein the seats are of semicircular shape.

8. The motor-vehicle transport container defined in claim 7 wherein the side members are each formed with an L-shaped slot having an outer end open outwardly and an inner end forming the respective seat.

9. The motor-vehicle transport container defined in claim 6 wherein the device-frame pivot formations project outward from the device-frame side members.

10. The motor-vehicle transport container defined in claim 9 wherein the seats are elongated parallel to the respective vehicle-frame side members and the device-frame pivot formations are flat tabs complementary to the seats and projecting outward from the device-frame side members.

11. The motor-vehicle transport container defined in claim 1 wherein the latch includes a movable bolt carried on one of the longitudinal members and a keeper recess on another of the longitudinal members and in which the bolt is receivable.

12. The motor-vehicle transport container defined in claim 11 wherein the one longitudinal member is the device-frame longitudinal member.

13. The motor-vehicle transport container defined in claim 12 wherein the vehicle frame is unitarily formed of plastic, the transport container further comprising
   a metal plate fixed to the one longitudinal and forming the keeper recess.

14. The motor-vehicle transport container defined in claim 13 wherein the vehicle frame is formed of a pair of frame halves having telescopingly interengageable sleeves, the plate being provided between the sleeves.

15. The motor-vehicle transport container defined in claim 13 wherein the plate is of L-section and has a tab extending parallel to a plane of the vehicle frame and engaged behind a portion of the vehicle frame.

16. The motor-vehicle transport container defined in claim 15 wherein the tab engages to a storage-compartment side behind the partition.

17. The motor-vehicle transport container defined in claim 1, further comprising
   an annular seal set in one of the frames and peripherally engaging the other of the frames in the mounted position.

18. The motor-vehicle transport container defined in claim 1, further comprising
   openable covers on the device frame, whereby a ski sack can be held inside the device frame.

19. The motor-vehicle transport container defined in claim 1 wherein each of the frames is unitarily formed of plastic.

20. The motor-vehicle transport container defined in claim 1 wherein the partition is a seat back.

* * * * *